Dec. 11, 1956  A. P. DOUGLAS  2,773,397
TRANSMISSION SHIPPER OPERATING DEVICE
Filed June 25, 1953  2 Sheets-Sheet 1

INVENTOR.
ALVIN P. DOUGLAS
BY *Albert R. Golrick*
ATTY.

Dec. 11, 1956 A. P. DOUGLAS 2,773,397
TRANSMISSION SHIPPER OPERATING DEVICE
Filed June 25, 1953 2 Sheets-Sheet 2
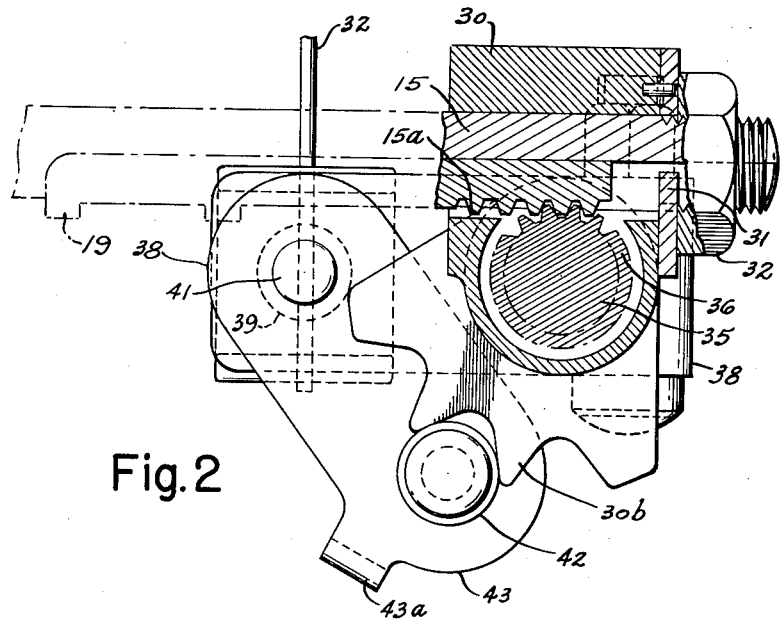
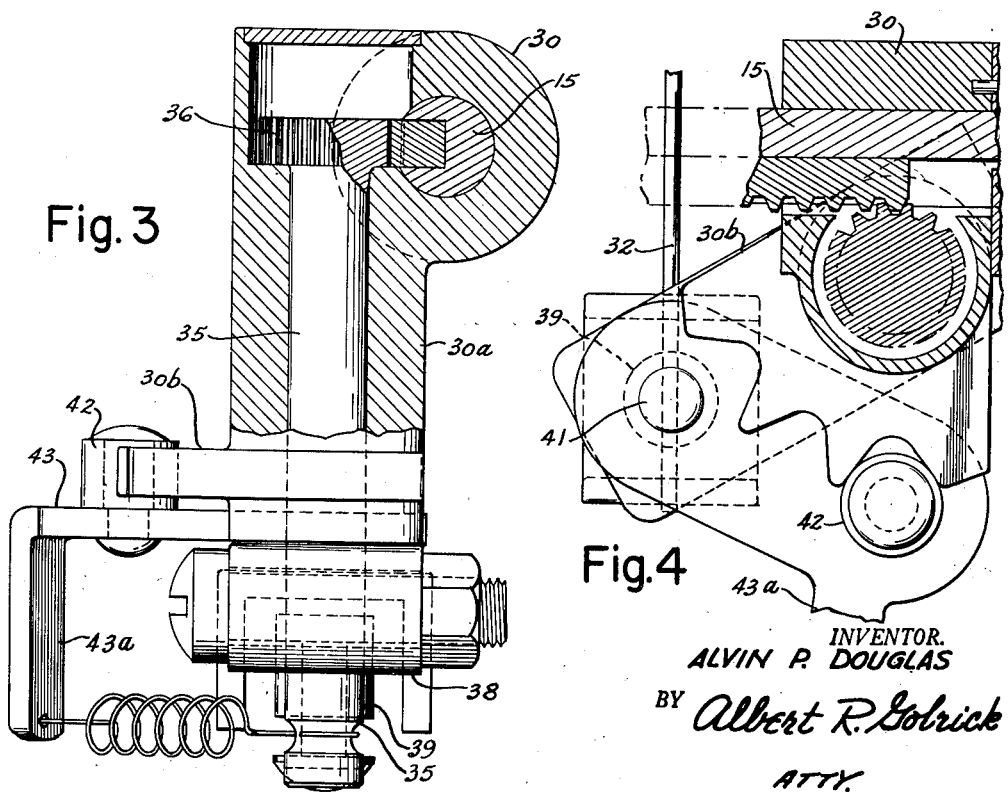
INVENTOR.
ALVIN P. DOUGLAS
BY Albert R. Golrick
ATTY.

United States Patent Office 2,773,397
Patented Dec. 11, 1956

2,773,397
TRANSMISSION SHIPPER OPERATING DEVICE

Alvin P. Douglas, Cleveland Heights, Ohio, assignor to The Murray-Ohio Manufacturing Company, Cleveland, Ohio, a corporation of Ohio Application June 25, 1953, Serial No. 364,156

4 Claims. (Cl. 74—473)

The present invention is related to the selectivity of gear settings in three speed bicycle transmissions and the general object thereof is the provision of a gear shipper operating means which may be manually operated through the use of a flexible push-pull rod in a positive and definite manner.

A further object of the present invention is the provision of a shipper actuating means for a three speed bicycle transmission which may be combined with a conversion unit for changing over a bicycle originally equipped with a rear wheel coaster brake mechanism into a three speed bicycle, the actuating means being attachable to the bicycle without necessitating any structural alteration of the bicycle or wheel hubs.

A more specific object of the present invention is the provision of a transmission gear shipper actuating mechanism which is simple in operating principle, but which will remain accurate throughout long periods of use.

Other objects of the present invention will become apparent from the following description referring to the accompanying drawings showing a preferred embodiment thereof. The essential characteristics of the invention are summarized in the claims.

Fig. 1 of the drawings illustrates my invention as applied to a transmission of the type referred to with a plane view of the shipper actuating mechanism;

Fig. 2 is an elevational view of the shipper actuating mechanism; and

Fig. 3 is a cross sectional view corresponding to the plane of the line 3—3 of Fig. 2.

Fig. 4 is a partial cross sectional view of the mechanism as shown in Fig. 3, but at a different setting.

Figure 1:
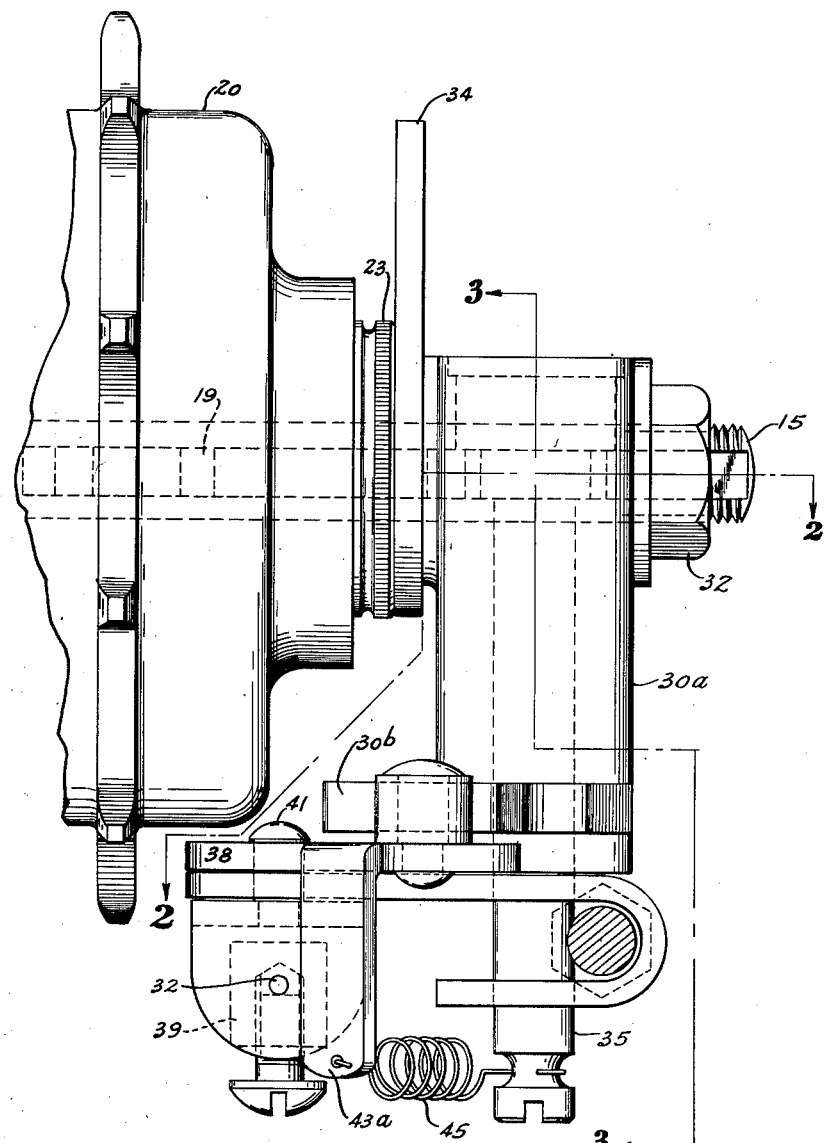

In the drawings, I have illustrated my invention as being combined with a three speed planetary gear transmission of the axially shiftable ring gear cage type whereby an overdrive and underdrive and a normal or direct drive is obtained by respectively coupling the driven member to the ring gear while the planet cage is coupled to the driving member, coupling the driving member to the ring gear while the planet cage is coupled to the driven member and coupling driving and driven members to the ring gear. In all three settings, the sun gear remains non-rotatively splined or slidably keyed to the axle. In Fig. 1, I have shown a transmission of the type referred to wherein the axially shiftable cage comprises cage plates 12, slidable, but non-rotating sun gear 14, planet gears 16 supported on plate spacer studs 17 and the sun gear 14 is restrained from rotation by a shipper key member 15 slidably disposed in a keyway formed in the axle 13.

The key 15 has two lugs 19 which engage the sun gear ends and the cage plates are rotatively supported by the sun gear ends which are reduced in diameter below the root diameter of the sun gear teeth.

The coupling of the cage elements for the speed change purposes stated is obtained by disposing the shiftable cage mechanism within a cup shaped driving member 20 and a cup shaped driven member 21, the members being disposed in an oppositely facing arrangement. The driven member has its hub constituting a coaster brake screw and bearing formation which effects clutching and braking actions upon the rear hub of the bicycle in the well known manner and is supported by a bearing. The driving member is supported upon a bearing 23 fixed to the axle.

For coupling the cage plates 12 have perimeter notches or slots and the ring gear perimeter has similar notches. Inwardly extending lugs 25 on the driving member 20 and lugs 26 on the driven member are axially spaced in such relation that when the cage is in a middle or central position the respective series of driving and driven lugs 25—26 are in engagement with the ring gear perimeter and direct drive is effected. When the cage is shifted to the extreme left as viewed in Fig. 1 and overdrive is effected and when the cage is shifted to the extreme right and underdrive is effected since the couplings of the driving and driven members and the cage structure and ring gear are effected in the order herein before stated. While all of the foregoing described mechanism is known in the art the means for effecting axial shifting of the cage comprised a precompressed spring disposed between the bearing 23 and the cage for effecting movement of the cage along the axle from right to left as viewed in Fig. 1. Shifting in the opposite direction was effected by a pull chain attached to the outer end of the shipper key 15. Thus positive movement of the coupling selection of the cage was effected in one direction only and the spring action varied due to many factors including spring fatigue, lubrication, variation under temperature changes, etc.

With the present invention, I propose to combine a shipper actuating means with the shipper key 15 in such manner that all gear change actions will be positive and the movement can be obtained with a flexible push and pull rod extending from a forwardly disposed selector lever to the rear axle of the bicycle in a protected position on the bicycle frame.

I incorporate a detent means in the shipper key actuating means whereby the three selectable positions of the cage and shipper key are well defined. This I accomplish by having the shipper key 15 constitute a gear rack actuated by a lever turned gear.

As shown in the drawings the shipper key 15 is extended outwardly in the axle keyway beyond the rear fork prongs of the bicycle frame through the bearing structure to a rack formation 15a. This formation terminates in a bracket structure 30 which is bored to fit upon the axle and be keyed thereto by a key member 31. The bracket is clamped on the axle nut 32 which clamps the inner end of the bracket to the bicycle crotch plate the latter being forced against the bearing member 23. Thus the bracket is rigidly positioned upon the axle with the rack end of the shipper key slidably disposed in the axle keyway therein.

The bracket 30 has a depending portion 30a forming a bearing support for a rocker shaft 35 offset relative to the axle centerline whereby the upper end thereof may support a gear member 36 with the teeth thereof in mesh with the rack formation 15a of the shipper key 15. The lower end of the shaft 35 has a rocker lever 38 secured thereto and the lever 38 is rocked by a push and pull rod 40 having the end thereof swivel connected to the lever 38 by a yoke member and pin 41. Thus a push and pull movement of the rod 40 effects an axial movement of the shipper key 15.

To obtain a definition of the three desired positions of the shiftable cage, I provide an exteriorly disposed detent means operatively disposed between the rocker lever 38 and the rigid bracket structure 30 which may be in the form of a star formation 30b on the depending portion 30a of the bracket 30 in radial relation to the axis of the rocker shaft 35. This detent formation is located at the lower end of the bracket part 30a whereby a roller 42 carried on the free end of a spring urged detent lever 43 pivotally mounted on the rocker lever is disposed to enter the detent formation 30b of the bracket structure. The detent lever 43 has an integral depending arm 43 extending downwardly below the rocking plane of lever 38 to afford connection for one end of a tension spring 45 which has the other end thereof hooked to the depending lower end of the shaft 35. Thus the detent lever 43 and its roller 42 are urged toward the detent 30b at all times. As the rocker lever is rocked, the roller will be cammed out of one detent and be forced into an adjacent detent under the influence of the spring and the detent design is such that the three desired positions of the cage are indicated.

It will be noted that in making a conversion the coaster brake axle is replaced by a longer axle with a keyway formation and the push and pull rod is disposed immediately adjacent the bicycle rear forks upon it may be supported by brackets of suitable form. The shipper actuating may be compactly arranged upon the rear axle without underly protruding. The disposition of the axis of the shaft 45 relative to the vertical may be varied by turning the axle at the time of assembly to dispose the keyway in any desired position, the desirability of which is determined by the direction of the reach of the push and pull rod.

I claim:

1. A shipper mechanism for a multi-speed bicycle transmission adapted to be keyed to and carried by the rear non-rotating axle of a bicycle, a non-rotating bicycle rear axle having an axially extending keyway, a bracket carried by the axle, a key member extending between the bracket and the axle to non-rotatably fix the bracket on the axle, said bracket having a depending bearing sleeve, a shaft supported by the sleeve, a rockable lever secured to the shaft adjacent the lower end of the sleeve, a detent segment fixed on the lower end of the bearing sleeve of the bracket, a yieldable detent lever pivotally mounted on the rocker lever operable with the fixed detent segment and the upper end of said shaft being adapted to operate a shipper member when rocked by said rockable lever.

2. The combination of a non-rotatable rear axle of a bicycle, said axle having an axially extending keyway formed therein, a shipper element axially shiftable in the axle keyway, a bracket structure fixed on the axle, said bracket having a depending bearing sleeve, a rockable shaft supported by said bearing sleeve with the upper end of the shaft adapted to actuate said shipper element and the lower portion of the shaft depending below the lower end of said sleeve, a manually operated rocker lever fixed on the depending portion of the shaft, a detent segment fixed on the sleeve, a push and pull rod pivotally connected to the outer portion of the rocker lever, a detent lever pivoted on said push and pull rod pivotal connection to the rocker lever and spring means yieldably urging the detent lever into engagement with the detent segment.

3. A shipper mechanism for a multi-speed bicycle transmission adapted to be keyed to and carried by the rear non-rotating axle of a bicycle, a non-rotating bicycle rear axle having an axially extending keyway, a bracket carried by the axle, a key member extending between the bracket and the axle to non-rotatably fix the bracket on the axle, said bracket having a depending bearing sleeve, a shaft supported by the sleeve and projecting out of the bottom of the bearing sleeve, a rockable lever secured to the projection of the shaft adjacent the lower end of the sleeve, a detent segment fixed on the lower end of the bearing sleeve of the bracket, a yieldable detent lever pivotally mounted on the rocker lever operable with the fixed detent segment, the upper end of said shaft being adapted to operate a shipper member when rocked by said rockable lever and a tension spring member connected to the projecting lower end of the shaft and to the detent lever.

4. A shipper mechanism for a multi-speed bicycle transmission adapted to be keyed to and carried by the rear non-rotating axle of a bicycle, a non-rotating bicycle rear axle having an axially extending keyway, a bracket carried by the axle with the axle extending therethrough, a key member extending between the bracket and the axle to non-rotatably fix the bracket on the axle, said bracket having a depending bearing sleeve, a shaft supported by the bearing sleeve, a rockable lever secured to the shaft adjacent the lower end of the sleeve, a detent segment on the lower end of the bearing sleeve of the bracket, a yieldable detent lever pivotally mounted on the rocker lever, a roller member on the detent lever operable with the fixed detent segment, a spring member acting on the detent lever to cause the roller to cam into the detents of the detent member and the upper end of said shaft being adapted to operate a shipper member when rocked by said rockable lever.

References Cited in the file of this patent

UNITED STATES PATENTS

| | | |
|---|---|---|
| 863,422 | Newton | Aug. 13, 1907 |
| 1,619,389 | Winters | Mar. 1, 1927 |
| 2,351,172 | Radtke | June 13, 1944 |
| 2,485,015 | White | Oct. 18, 1949 |
| 2,522,779 | Culkosky | Sept. 19, 1950 |

FOREIGN PATENTS

| | | |
|---|---|---|
| 168,446 | Austria | June 11, 1951 |